(12) United States Patent
Sautter et al.

(10) Patent No.: US 8,210,407 B2
(45) Date of Patent: Jul. 3, 2012

(54) BICYCLE CARRIER WITH FORK MOUNT AND UNIVERSAL CROSSBAR CLAMP

(75) Inventors: Chris Sautter, Portland, OR (US); Kevin E. Lesley, Beaverton, OR (US)

(73) Assignee: Yakima Products, Inc., Beaverton, OR (US)

( * ) Notice: Subject to any disclaimer, the term of this patent is extended or adjusted under 35 U.S.C. 154(b) by 422 days.

(21) Appl. No.: 12/490,257

(22) Filed: Jun. 23, 2009

(65) Prior Publication Data

US 2010/0078454 A1    Apr. 1, 2010

Related U.S. Application Data

(60) Provisional application No. 61/132,962, filed on Jun. 23, 2008.

(51) Int. Cl.
*B60R 9/10* (2006.01)
(52) U.S. Cl. ......... 224/315; 224/319; 224/324; 224/924
(58) Field of Classification Search .................. 224/315, 224/319, 324, 924, 209, 321, 325, 320, 310; D12/408; 410/3
See application file for complete search history.

(56) References Cited

U.S. PATENT DOCUMENTS

| | | | |
|---|---|---|---|
| 3,861,533 A | 1/1975 | Radek | |
| 5,875,947 A | 3/1999 | Noel | |
| 6,561,398 B1 * | 5/2003 | Cole et al. | 224/324 |
| 6,681,971 B2 * | 1/2004 | Laverack et al. | 224/319 |
| 6,736,300 B2 * | 5/2004 | Deakin | 224/319 |
| 6,938,782 B2 * | 9/2005 | Dean et al. | 211/20 |
| 7,004,365 B2 * | 2/2006 | Ingram | 224/401 |
| 7,357,283 B2 * | 4/2008 | Settelmayer | 224/322 |
| 2002/0125282 A1 | 9/2002 | Laverack | |
| 2006/0060622 A1 * | 3/2006 | Prenger | 224/502 |
| 2006/0249466 A1 | 11/2006 | Wang | |
| 2007/0119887 A1 | 5/2007 | Foley | |

OTHER PUBLICATIONS

The International Bureau of WIPO, International Search Report regarding PCT Application No. PCT/US2009/048332, dated Nov. 9, 2009, 2 pages.
Patent Cooperation Treaty "International Preliminary Report on Patentability" Application No. PCT/US2009/048332 dated Jan. 13, 2011, 9 pages.

* cited by examiner

*Primary Examiner* — Justin Larson
(74) *Attorney, Agent, or Firm* — Kolisoh Hartwell, P.C.

(57) ABSTRACT

A fork mount for securing a bicycle fork to a crossbar that comprises a top clamp including a pair of side surfaces having substantially aligned openings, an upper crossbar surface having a hole, and an adjustment surface with a plurality of substantially horizontal grooves. The fork mount further comprises a bottom clamp that has a groove engager frictionally engagable within each groove to form a pivot point to a clamped position, and a lower crossbar surface with a hole. When in the clamped position, the upper and lower crossbar surfaces form a crossbar opening and the holes of each crossbar surface are substantially alignable. The fork mount comprises a connector that is engagable through the substantially alignable holes of each crossbar surface, wherein the connector secures the top and bottom clamps in the clamped position. A skewer is extendable through the substantially aligned openings of the top clamp.

18 Claims, 9 Drawing Sheets

BICYCLE CARRIER WITH FORK MOUNT AND UNIVERSAL CROSSBAR CLAMP

CROSS-REFERENCE TO RELATED APPLICATION

This application claims priority from U.S. Provisional Patent Application Ser. No. 61/132,962, filed Jun. 23, 2008 which is incorporated herein by reference.

BACKGROUND

The present disclosure relates to bicycle racks that are adaptable for mounting on crossbars on top of a vehicle.

Bicycles are often transported on vehicles. Numerous racks and devices have been devised over the years to secure bicycles to vehicles during transport. A common bicycle carrier utilizes a fork mount mounted to a rack structure. The fork mount has a skewer assembly that clamps the front forks of a bicycle to secure the bicycle to the rack. Typically, fork mount-type carriers include a wheel tray that extends back from the fork mount to support the rear wheel. A securing member may be positioned along the wheel tray that includes a strap configured to secure the rear wheel to the wheel tray. Typically, these straps must be pulled tightly around the rear wheel to hold it securely during normal driving speeds and conditions.

Examples of fork mount-type bicycle carriers, and various types of securing mechanisms are found in U.S. Pat. Nos. 6,748,630; 6,684,667; 6,601,712; 6,561,398; 6,494,351; 6,460,708; 6,431,423; 6,425,509; 6,283,310; 5,749,694; 5,745,959; 5,738,258; 5,598,959; 5,479,836; 5,416,952; 5,265,897; 4,842,148; 3,848,784; 3,828,993, and U.S. Patent Application Nos. 2006/0086766 and 2007/0119887, the disclosures of which are hereby incorporated by reference in their entirety for all purposes.

Many fork mount bicycle carriers are designed for attachment to specifically shaped crossbars. However, vehicle rack crossbars now are provided in a wide range of different shapes, sizes, and orientations. Most car companies offer factory crossbars which typically have curved geometries of differing sizes and orientations designed to minimize wind resistance. Most currently available fork mounts do not clamp satisfactorily on factory crossbars. There is a need for fork mount style bicycle racks that are capable of securely fastening directly to factory crossbars on top of a vehicle.

SUMMARY

A fork mount rack for carrying a bicycle on top of a vehicle includes a wheel tray attached to a fork mount. The fork mount is adaptable to crossbars of different shapes and sizes.

DETAILED DESCRIPTION

Figure 1:
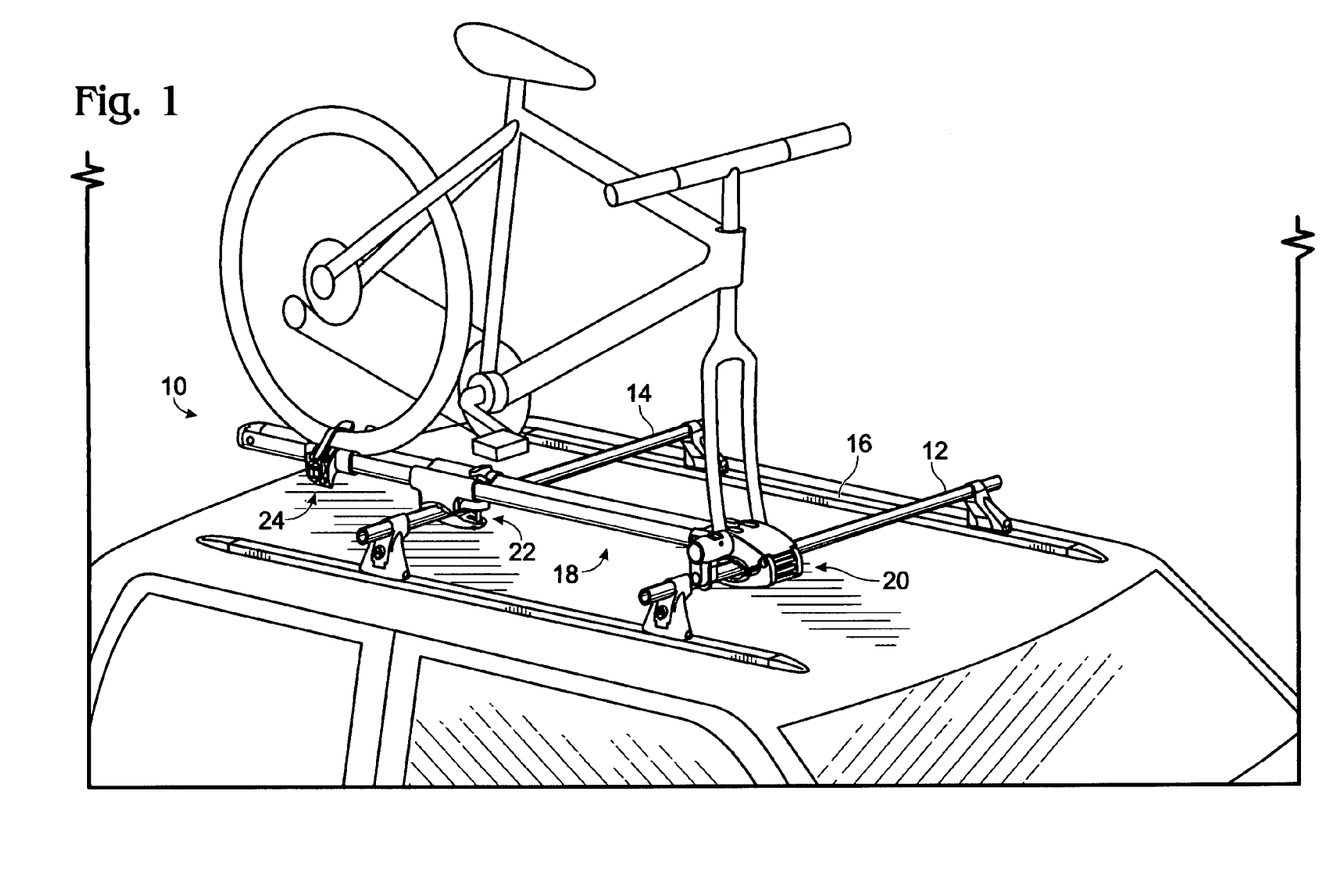
FIG. 1 is a perspective view of a bicycle carrier mounted on top of a vehicle.

FIG. 1 shows a bicycle carrier 10 mounted on a vehicle. Bicycle carrier 10 may be attached, connected, and/or secured to front crossbar 12 and rear crossbar 14 of roof rack 16. Crossbars 12 and 14 each extend across a portion of a roof of the vehicle and can be of any shape (e.g., round, oval, rectangular, or square in cross-section), size, or orientation. Bicycle carrier 10 is adapted to mount on a crossbar of any of multiple shapes, sizes, and/or orientations. Roof rack 16 and crossbars 12, 14 may be mounted to the vehicle in any manner known to those skilled in the art. As shown in FIG. 1, bicycle carrier 10 includes support structure 18, fork mount 20, rear bar mount 22, and rear wheel mount 24.

Support Structure

Figure 2:
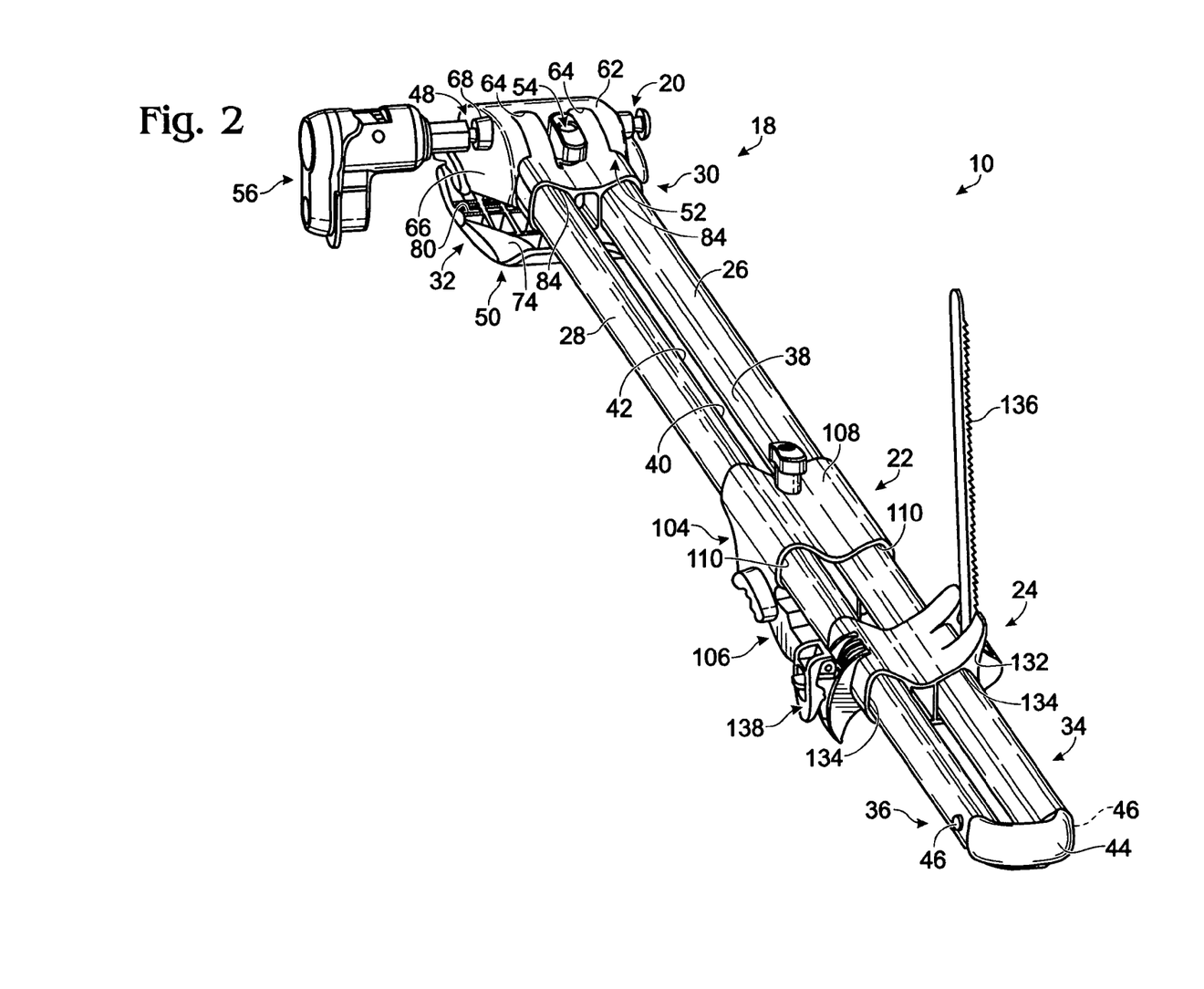
FIG. 2 is a perspective view of the bicycle carrier of FIG. 1.

As shown in FIGS. 1 and 2, support structure 18 extends across front crossbar 12 and rear crossbar 14, and may include a pair of hollow rails, tubes, or members 26, 28 that each may respectively have front ends 30, 32; open rear ends 34, 36; and elongated inner surfaces 38, 40 that extend between the front and rear ends. Rails 26, 28 can be made of any suitable material, such as plastic or metal (e.g., aluminum), and may be solid instead of hollow. Rear ends 34, 36 may also be solid or closed, instead of open.

Inner surfaces 38, 40 may be positioned opposite each other with a gap 42 between them. Rails 26, 28 allow better water drainage through gap 42 compared to previous wheel trays. Split rails 26, 28, as shown, may also provide better torsional stiffness compared to a traditional U-shaped rail or tube design because two rails or tubes 26, 28 are stiffer than the U-shaped design of prior wheel trays. Split rails 26, 28 in this manner are also aesthetically distinctive compared to previous designs. Other advantages of support structure 18 employing rails 26, 28 will be apparent throughout the description below.

Inner surfaces 38, 40 may be straight, oval, curved, concave, convex, or any other shape desired. Portions of an end cap 44 extends through open rear ends 34, 36. End cap 44 is secured to rails 26, 28 using an attachment mechanism 46, such as a push button. As best seen in FIG. 2, the attachment mechanism 46 may be biased to extend through one or more holes near open rear ends 34, 36 of rails 26, 28. When attachment mechanism 46 is extended through the holes, end cap 44 is secured to rails 26, 28. To remove end cap 44, spring biased button 46 is pushed inward out of the holes, allowing end cap 44 to be removed from open ends 34, 36.

In some embodiments, bicycle carrier 10 and support structure 18 may be adapted for carrying various other articles commonly carried exteriorly of a vehicle. Articles which may be carried on a related carrier may include luggage carried on or in luggage racks or mounts, skis and ski boots carried on or in ski racks or mounts, and kayaks, canoes, rafts or other water-usable items or equipment carried on or in water sport racks or mounts, to name just a few.

Fork Mount

A fork mount for securing a bicycle fork to a crossbar includes a top clamp including a pair of side surfaces having substantially aligned openings, an upper crossbar surface having a hole, and an adjustment surface with a plurality of substantially horizontal grooves. The fork mount further includes a bottom clamp that has a groove engager frictionally engagable within each groove to form a pivot point to a clamped position, and a lower crossbar surface with a hole. When in the clamped position, the upper and lower crossbar surfaces form a crossbar opening and the holes of each crossbar surface are substantially alignable. The fork mount comprises a connector that is engagable through the substantially alignable holes of each crossbar surface, wherein the connector secures the top and bottom clamps in the clamped position. A skewer is extendable through the substantially aligned openings of the top clamp.

As shown in FIGS. 1 and 2, located at or near front ends 30, 32 of support structure 18 is a fork mount 20. Fork mount 20 is adapted for mounting on crossbars of different shapes and sizes, such as front cross bar 12, and can be used to secure a front fork of a bicycle.

Figures 3, 4:
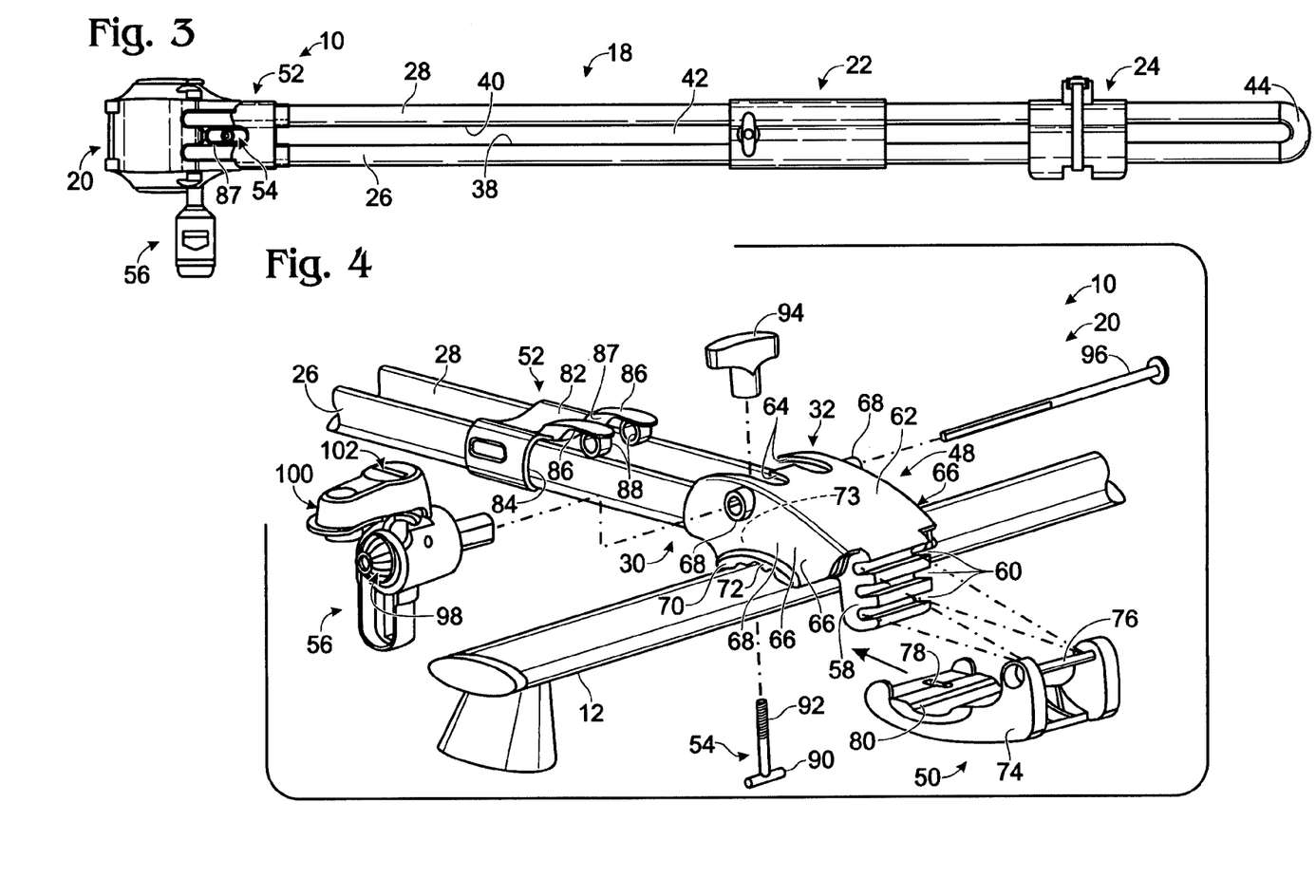
FIG. 3 is a top view of the bicycle carrier of FIG. 1.
FIG. 4 is an exploded view of the fork mount of FIG. 1.

As best seen in FIGS. 2-4, fork mount 20 includes top clamp 48, bottom clamp 50, securement piece 52, connector 54, and skewer 56. Top clamp 48 may be connected to front ends 30, 32 in any suitable manner (with screws, welding, etc.). Top clamp 48 may include a front or adjustment surface 58 that has grooves or an adjustment area 60, an upper surface 62 with receiving slots 64 that receive a portion of securement piece 52, side surfaces 66 with holes or openings 68 that receive a portion of skewer 56, and a bottom surface 70 with grip 72 that engages front crossbar 12 and a hole or opening 73 that receives a portion of connector 54.

In some embodiments, such as the one depicted in FIG. 4, top clamp 48 may have three substantially horizontal grooves 60 positioned or aligned vertically on front surface 58. In other embodiments, fewer or more grooves 60 may be used, as desired. Grooves 60 may also be positioned or aligned in any formation desired, such as aligned vertically (as shown in FIG. 4) or in a staggered formation. Any distance between each substantially horizontal groove may be selected, as desired. In some embodiments, grooves or slots 60 may be oriented differently, such as substantially vertically instead of as substantially horizontally. Instead of grooves 60, top clamp 48 may in some embodiments employ a substantially vertical slot.

Receiving slots 64 are shown as a pair of oval shaped slots open on one end. It will be appreciated that receiving slots 64 may be only one slot, or more than two slots, and may be any size or shape desired. Grip 72 may be any suitable design for creating friction, such as a ribbed surface. Grip 72 may be comprised of any suitable material for creating friction, for example, rubber or hard plastic.

Bottom clamp 50 may include body 74 with a groove or adjustment area engager (such as a bar) 76 that frictionally engages any of grooves 60 of top clamp 48, a hole or opening 78 that receives a portion of connector 54, indent 79 (see FIG. 9), and grip 80, which may use the same or a different design or construction as grip 72, that engages front crossbar 12.

As shown in FIG. 4, groove or adjustment area engager 76 may engage any of grooves 60. The groove engaged will depend on the size and shape of the crossbar to which fork mount 20 is being clamped. For example, for smaller crossbars, or for round or square ones, groove engager 76 may be engaged into uppermost groove 60. For larger crossbars, the other grooves 60 may be engaged. Once engaged, groove engager 76 and groove 60 may create a pivot or hinge point, allowing top clamp 48 and bottom clamp 50 to be positioned around a crossbar, such as front crossbar 12.

In other embodiments, such as ones where grooves 60 are aligned, shaped, or oriented differently, groove engager 76 will be of a different, appropriate structure to engage such a differently aligned, shaped, or oriented groove. In other embodiments, no pivot or hinge point may be created. Instead groove engager 76 may engage groove 60 to create a substantially fixed relationship between top clamp 48 and bottom clamp 50, allowing another component, such as connector 54, to adjust around the crossbar. It will be appreciated that any suitable mechanism may be used to connect top clamp 48 and bottom clamp 50 together provided that it allows for vertical adjustment between them relative to a crossbar.

Indent 79 may be adapted to hold a portion of connector 54 in a position that promotes better or easier tightening or clamping between top clamp 48 and bottom clamp 50.

Securement piece 52 may include body 82 with one or more rail receiver slots 84, one or more protrusions 86, a gap 87 that receives a portion of connector 54, and one or more holes or openings 88 that are adapted to receive a portion of skewer 56.

Rail receiver slots 84 fit around round rails 26, 28 so that securement piece 52 can slide back and forth, towards and away from front ends 30, 32 of rails 26, 28. In some embodiments, rail receiver slot 84 may be a long, continuous area or slot that fits around both rails 26, 28, allowing securement piece 52 to slide on rails 26, 28.

One or more protrusions 86 may be of a similar shape or contour as receiving slot 64 of top clamp 48, but slightly smaller, thus allowing protrusions 86 to mate into receiving slot 64. The shape or contour of protrusions 86 may be dependent upon the shape or contour of rail receiving slot 64.

Gap 87 may exist between, and lie parallel to, protrusions 86 to receive a portion of connector 54. As such, when connector 54 is received in gap 87, connector 54 may be prevented from moving or being adjusted by protrusions 86 (see FIG. 2).

Figure 9:
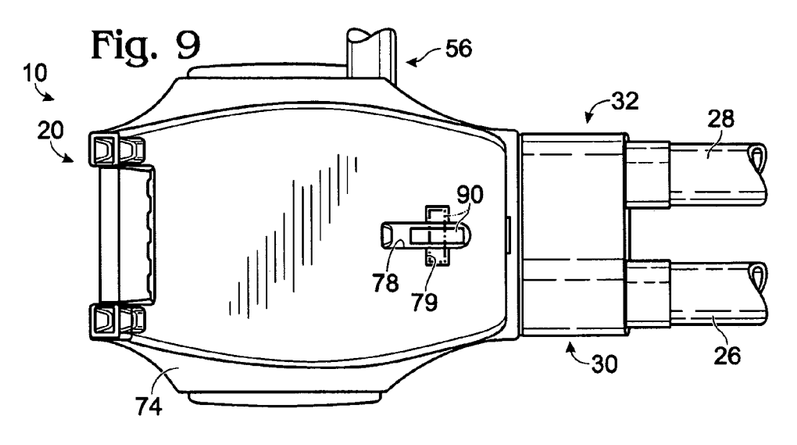
FIG. 9 is a bottom view of the fork mount of FIG. 1.

Connector 54 is adapted to clamp or tighten top clamp 48 and bottom clamp 50 around an object, such as around front cross bar 12. Connector 54 may include t-bar 90 with threaded end 92, and an adjustment portion (or handle or knob) 94. As best seen in FIGS. 4 and 9, a portion of t-bar 90 may extend through hole or openings 73 (of top clamp 48) and 78 (of bottom clamp 50). Threaded end 92 engages a hollow threaded portion (not shown) of knob 94. The turning of knob 94 when engaged to threaded end 92 allows adjustment of the distance between knob 94 and the tee portion of t-bar 90. When coupled to top clamp 48 and bottom clamp 50, turning of knob 94 adjusts the distance between top clamp 48 and bottom clamp 50. As shown in FIG. 9, the tee portion of t-bar 90 may rotate 90 degrees upon extension into hole or opening 98, and sit in indent 79. Any suitable connector may be used to tighten or secure top bar 48 to bottom bar 50 around a crossbar.

As seen in FIG. 4, skewer 56 may contain a skewer bolt 96, an adjustment mechanism 98, an actuator handle 100, and lock mechanism 102. Skewer bolt 96 is sized to receive a fork of a bicycle. Skewer bolt 96 is also sized to extend through holes or openings 68 (of top clamp 48) and 88 (of securement piece 52). When so extended, portions of skewer bolt 96 may be exposed adjacent each of side surfaces 66. The exposed portions provide an area on which a bicycle fork may be coupled to fork mount 20. A portion of adjustment mechanism 98 engages skewer bolt 96. When engaged, adjustment mechanism 98 allows adjustment of skewer 56 to accommodate different fork sizes. Turning a knob or handle of the adjustment mechanism will tighten or loosen the bicycle fork relative to skewer 56 and top clamp 48. When tightened enough, fork 56 will be clamped between skewer 56 and top clamp 48 such that the bicycle fork cannot be removed from the fork mount.

Figure 7:
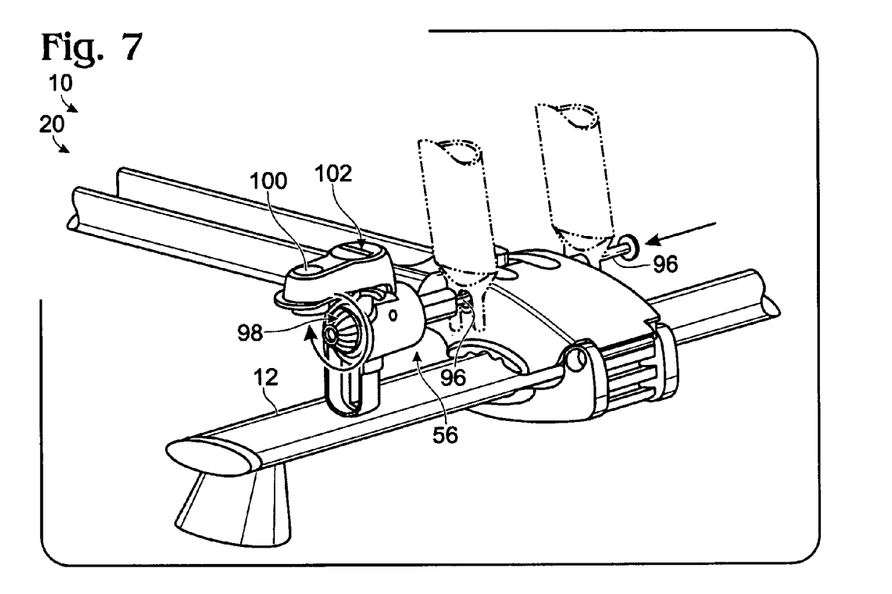
Figure 8:
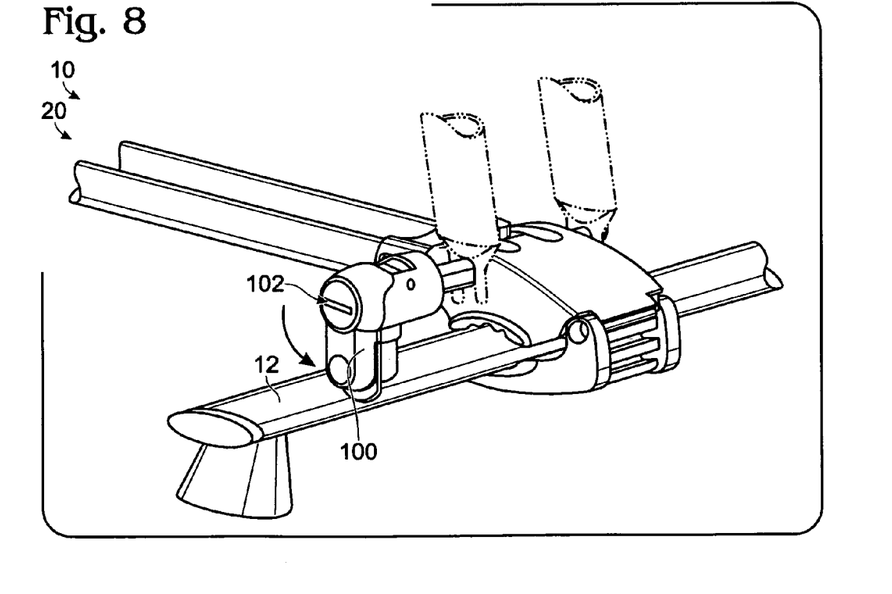

Referring to FIGS. 7 and 8, actuator handle 100 has a first position that permits manipulation of adjustment mechanism or dial 98, and a second position that prevents such manipulation. In the second position, lock 102 may be used to prevent movement of actuator handle 100 into the first position. Any suitable lock may be used, such as a conventional keyed lock.

Using techniques known in the art, skewer 56 may be adapted to prevent skewer bolt 96 from being rotated relative to adjustment mechanism 98 without a user actually manipulating adjustment mechanism 98. A suitable skewer that secures bicycle forks to a fork mount is disclosed in U.S. Patent Application No. 2007/0119887, which is incorporated herein by reference.

Figure 5:
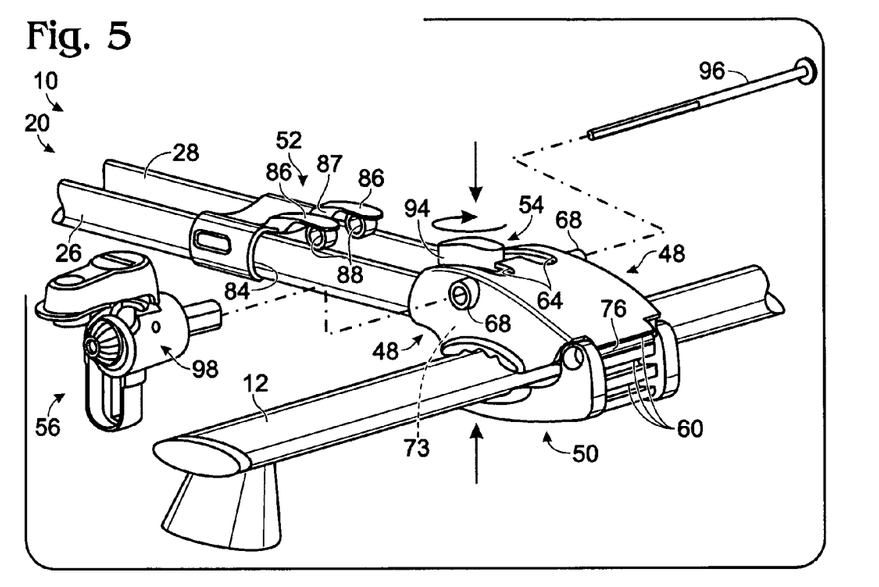
FIGS. 5-8 are perspective views of the fork mount of FIG. 1 with a top clamp, a bottom clamp, a connector, and a skewer assembly.

FIGS. 5-8 show an illustrative, non-exclusive embodiment of fork mount 20 being secured to crossbar 12 and to a bicycle fork. Referring first to FIG. 5, groove engager 76 of bottom clamp 50 is placed into any of grooves 60 of top clamp 48, depending upon the shape or contour, and size, of crossbar 12. Top clamp 48 and top clamp 50 are then positioned or pivoted around crossbar 12. In other embodiments, top clamp 48 and bottom clamp 50 may first be positioned around crossbar 12 before groove 60 is engaged by groove engager 76.

When top clamp 48 and bottom clamp 50 are positioned around crossbar 12, holes or opening 73 (of top clamp 48) and 78 (of bottom clamp 50) may be substantially aligned. A portion of connector 54 may extend through these substantially aligned holes. For example, t-bar 92 may be extended through these substantially aligned holes with at least a portion of threaded end 94 exposed above hole or opening 73 of top clamp 48. Knob 94 may be connected to threaded end 94, and (as shown by the black circular arrow in FIG. 5) manipulated to secure (clamp or tighten) top clamp 48 and bottom clamp 50 around crossbar 12 as desired. To help properly position connector 54 during such manipulation, the tee portion of t-bar 92 may be positioned into indent 70 of bottom clamp 50 (see dashed 92 in FIG. 9). Upper surface 62 of top clamp 48 may provide an area or clearance that allows knob 94 to be manipulated to a position below the plane of upper surface 62 towards crossbar 12, if desired or needed to secure fork mount 20 to crossbar 12.

To achieve a better or different desired fit or tightness around crossbar 48, groove engager 60 may be placed into a different groove 60 and/or knob 94 may be manipulated. As such, fork mount 20 may be secured to crossbars of many different shapes or contours, or sizes, including the various types of crossbars typically used in association with a roof rack of a vehicle.

Figure 6:
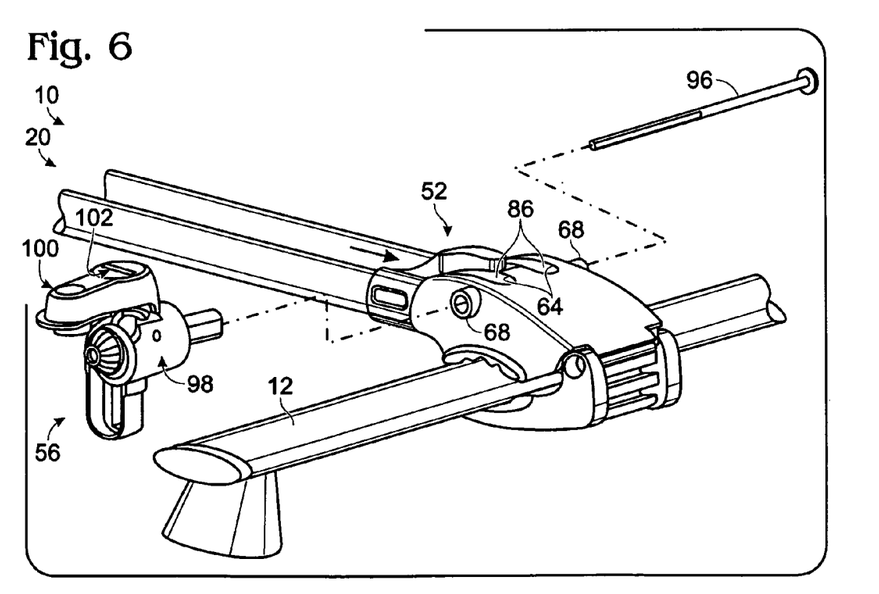

Securement piece 52 may be moved along rails 26, 28 (or in any manner) from an uncoupled position of FIG. 5 to a coupled position of FIG. 6 with top clamp 48. In the coupled position (shown in FIG. 6), protrusions 86 of securement piece 52 may be received by and mate with receiving slots 64 of top clamp 50. Knob 94 may positioned so that a length of knob 94 is positioned in gap 87 between the pair of receiving slots 64 of top clamp 48. At least a portion (or the entirety) of knob 94 may be located below a plane of protrusions 86 towards cross bar 12. When so coupled, protrusions 86 may prevent the turning of knob 94 (see FIG. 2). Holes or openings 68 (of top clamp 48) and 88 (of securement piece 52) may also be substantially aligned in the coupled position.

Turning to FIG. 7, skewer bolt 96 may extend through substantially aligned holes or openings 68, 88 such that a portion of skewer bolt 96 may be exposed adjacent each of side surfaces 66 of top clamp 48. When extended as such, skewer bolt 96 may prevent moving securement piece 52 from the coupled position to the uncoupled position (i.e., any position that is not the coupled position). The bicycle fork may be coupled in the area of skewer bolt 94 adjacent each of side surfaces 66, and skewer bolt 96 may be operatively connected to adjustment mechanism 98. As indicated by the circular black arrow in FIG. 7, adjust mechanism 98 may be manipulated to a position where the bicycle fork is engaged or secured between top clamp 48 and skewer 56 so that the bicycle fork cannot be removed from fork mount 20 (see FIG. 8).

Actuator handle 100 may be moved from the first position of FIG. 7 to the second position of FIG. 8. In the second position, adjustment mechanism 98 can no longer be manipulated. Lock 102 can be locked to prevent actuator handle 100 from being moved to a first position or any other position that would allow manipulation of adjustment mechanism 98. In a preferred embodiment handle/cover 102 has a cam device which causes lighting of the clamp on a fork when the cover is moved to its closed position. In this configuration dial 98 is used to approach an appropriate clamping position, with final clamping being accomplished by pivoting the cam/cover/handle to its closed position.

In the locked position, lock 102 may be used to prevent removal of the bicycle fork from fork mount 20 and also of fork mount 20 from crossbar 12. As described above, the locked position of lock 102 may prevent actuator handle 100 from being moved out of the second position, meaning that no further manipulation of adjustment mechanism 98 is possible.

Regarding removal of fork mount 20 from crossbar 12, the locked position of lock 102 may prevent actuator handle 100 from being moved out of the second position, meaning that locking of lock 102 prevents further manipulation of adjustment mechanism 98. Because skewer bar 96 may only be detached from skewer 56 by manipulating adjustment mechanism 98, the locked position of lock 102 prevents removal of skewer bar 96 from fork mount 20. Skewer 56 prevents securement piece 52 from disengaging from the coupled position. In turn, securement piece 52, in the coupled position, prevents manipulation or rotation of knob 94 of connector 54, meaning that top clamp 48 and bottom clamp 50 cannot be decoupled from crossbar 12. As such, a user may feel assured that fork mount 20 and the bicycle fork are both secured to cross bar 12 of the vehicle once lock 102 is in the locked position.

Rear Bar Mount

Rear bar mount 22 is adapted to secure bicycle carrier 10 to a crossbar of the vehicle, such as to rear crossbar 14. Although rear bar mount 22 is shown as clamping to a rear crossbar, it will be appreciated that rear bar mount 22 can be clamped to any desired crossbar, such as one located at the front or rear of a roof of a vehicle or on a trailer.

Figure 10:
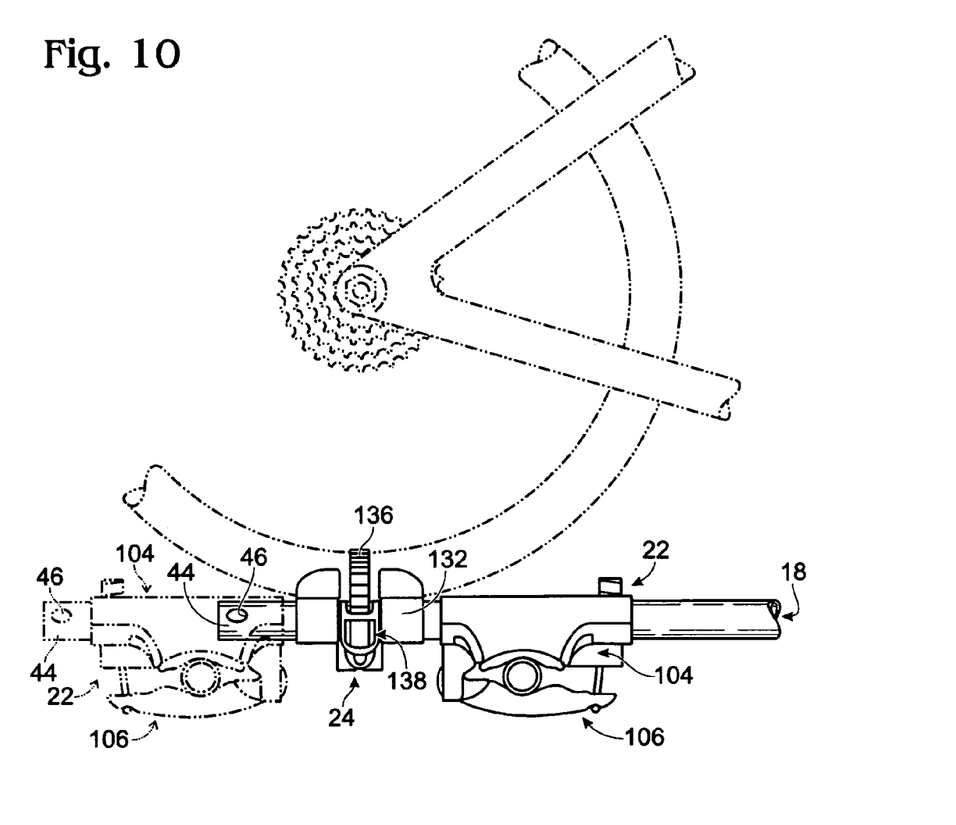
FIG. 10 is a side view of the rear bar mount and the rear tire mount of the bicycle carrier of FIG. 1.
Figure 11:
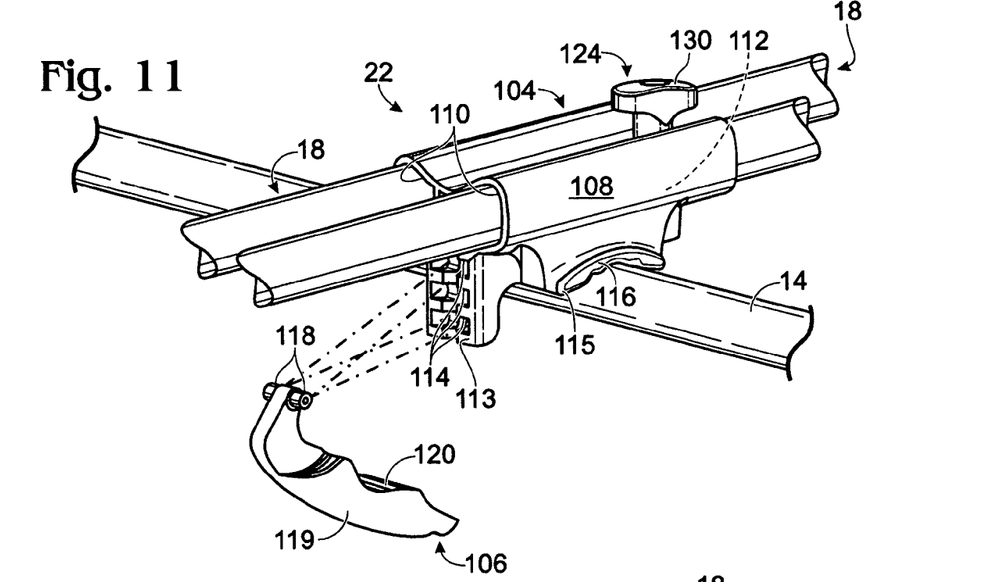
FIG. 11 is a partially exploded, perspective view of the rear bar mount of FIG. 1.
Figure 12:
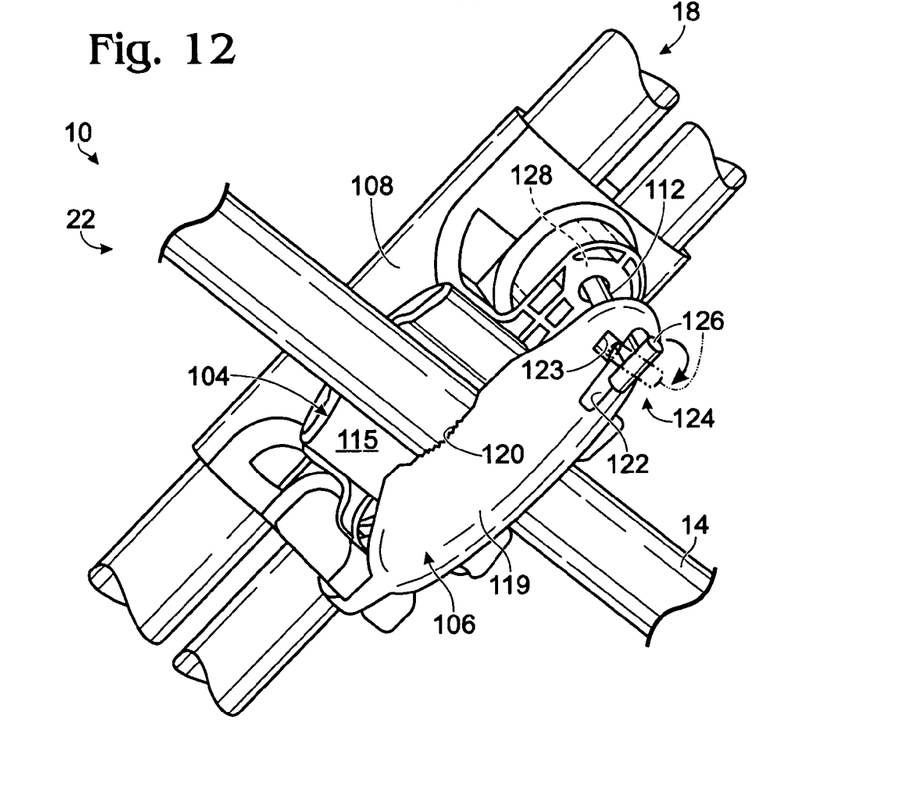
FIG. 12 is a bottom perspective view of the rear bar mount of FIG. 1.

As shown in FIGS. 10-12, rear bar mount 22 may include upper clamp 104, lower clamp 106, and connector 124. Upper clamp 104 and lower clamp 106, in combination, may clamp around and secure to rear crossbar 14. Upper clamp 104 may have a body 108 with a pair of rail receiver slots 110, a hole or opening 112 that receives a portion of connector 124, an end surface 113 with grooves 114, and a bottom surface 115 with grip 116. Rail receiver slots 110 are configured similar to the one or more rail receiver slots 84 of securement piece 52. As such, upper clamp 104, and rear bar mount 22, may be moved back and forth along rails 26, 28 to position upper clamp 104 adjacent to a desired crossbar for clamping, such as adjacent to rear crossbar 14. Grooves 114 may be similar to grooves 60 of top clamp 48 for fork mount 20, while grip 116 may be similar to grip 72. Each of these features of upper clamp 104 may be configured using any of the embodiments described above.

Lower clamp 106 includes groove engager 118, surface 119 with grip 120, hole or opening 122, and indent 123. Groove engager 118 is adapted to engage any of grooves 114, similar to groove engager 76 of bottom clamp 74 for fork mount 20. Which of grooves 114 is selectively engaged may depend on the size of the crossbar to which rear bar mount 22 is being clamped. For example, for smaller crossbars, or for the round or square crossbars typically used in vehicle roof rack systems, groove engager 60 may be engaged to the uppermost groove 114 to achieve a secure clamp.

Holes or openings 112 and 122 may be adapted to receive connector 124, which may be similar to connector 54. Connector 124 may include t-bar 126 with a threaded end 128 that engages threaded receiver of knob 130.

Indent 123 may be similar to indent 79 of fork mount 20. Indent 123 may provide an indented portion area in the body of lower clamp 106 adapted to house, and sized to receive, the tee-portion of t-bar 126. In other embodiments, connector 124 (and/or connector 54) may grip against the surface of lower clamp 106 (and/or bottom clamp 58) without the body having an indentation adapted to receive a connector.

In operation, groove engager 76 may be selectively engaged into groove 114. Upper clamp 104 and lower clamp 106 may be positioned around rear crossbar 14 such that holes or opening 112 and 122 are substantially aligned. T-bar 126 may be extended through substantially aligned holes 112 and 122 and gap 42. The t-bar portion of t-bar 126 may be rotated to rest in indent 123 of bottom 119. Knob 130, which is connected to threaded end 128 of t-bar 126, may be manipulated to secure or clamp upper clamp 108 and lower clamp 110 of rear bar mount 22 around rear crossbar 14. Groove engager 76 may be placed into a different groove 60 and/or knob 130 may be manipulated to achieve the desired fit or securement around crossbar 14.

Rear Fork Mount

Figure 13:
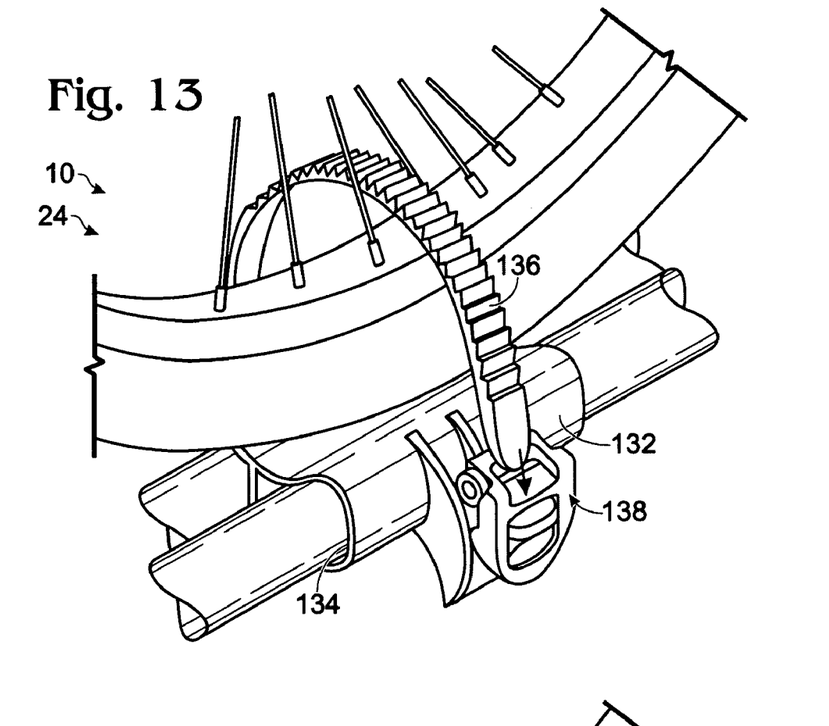
FIG. 13 is a perspective view of the rear tire mount of FIG. 1 with a strap disengaged from a strap securement mechanism.
Figure 14:
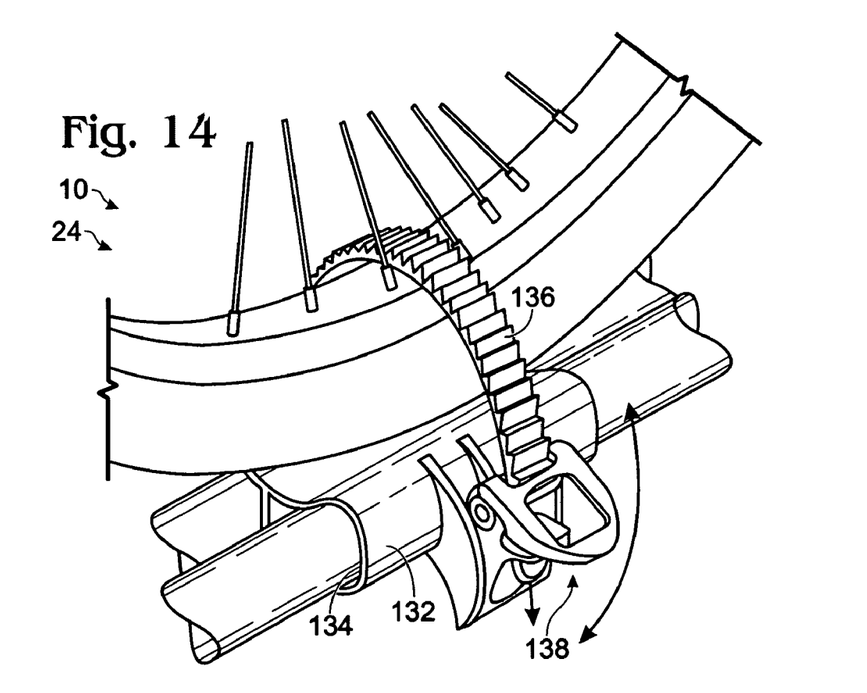
FIG. 14 is a perspective view of the rear tire mount of FIG. 1 with the strap engaged to the strap securement mechanism.

Rear wheel mount 24 may include any mechanism adapted to selectively support a rear wheel of a bicycle. As best shown in FIGS. 13-14, rear wheel mount 24 may include body 132, pair of rail receiver slots 134, strap 136, and an adjustment mechanism 138. Body 132 may be concave or otherwise shaped to allow temporary support of a tire without the use of strap 136. Rail receiver slots 134 are similar to rail receiver slots 64 and 84 described above. As such, a user may thereby slide or position the rear wheel mount 24 closer or further from fork mount 20, thereby enabling a user to selectively secure the rear wheels of different bicycles having varied wheelbases.

Strap 136 may include any mechanism for securing the rear wheel of a bicycle to the rear wheel mount 24. The strap may be formed integrally with or separately from rear wheel mount 24. Strap 136 may include one or more teeth that extend laterally across the strap.

Adjustment mechanism 138 may include any mechanism for tightening and loosening the strap around the rear wheels of a bicycle. For example, the adjustment mechanism may include a buckle, such as those disclosed in U.S. Pat. No. 6,561,398 and/or U.S. Pat. No. 6,283,310, which are incorporated by reference. The adjustment mechanism 138 may also include any type of buckle having a ratcheting assembly for selectively engaging the strap's teeth, such as buckles made by Everest or Burton for use in snowboard bindings.

Rear bar mount 22 and rear wheel mount 24 may be positioned in multiple ways relative to one another, depending on the size of the bicycle being secured with bicycle carrier 10. For example, as shown in FIG. 10, rear wheel mount 24 may be positioned between rear bar mount 22 and end cap 44. As shown in dashed lines in FIG. 10, rear bar mount 22 may also be positioned between rear wheel mount 24 and end cap 44.

Rear bar mount 22 and rear fork mount 24 are each reversible. For example, rear bar mount 22 may be positioned onto rails 26, 28 with connector 24 positioned closer to fork mount 20 (see FIG. 10) or closer to end cap 44 (see dashed lines in FIG. 10). Rear fork mount 24 may also be positioned so that the buckle mechanism is either proximate rail 26 or rail 28, whichever is preferred. Taken together, bicycle carrier 10 is adapted to accommodate bicycles having many different sizes, shapes, and wheelbases.

To reposition rear bar mount 22 relative to rear fork mount 24, or to reverse either one on rails 26, 28, end cap 44 may be removed by engaging push button 46 and removing end cap 44 from the open rear ends of rails 34, 36. Once end cap 44 is removed, rear bar mount 22 and/or rear fork mount 24 may be slid off of open rear ends 34, 36 of rails 26, 28 and repositioned relative to each other or reversed as desired.

In other embodiments rear bar mount 22 and rear fork mount 24 may be combined as one unit.

Another Fork Mount Embodiment

Figure 15:
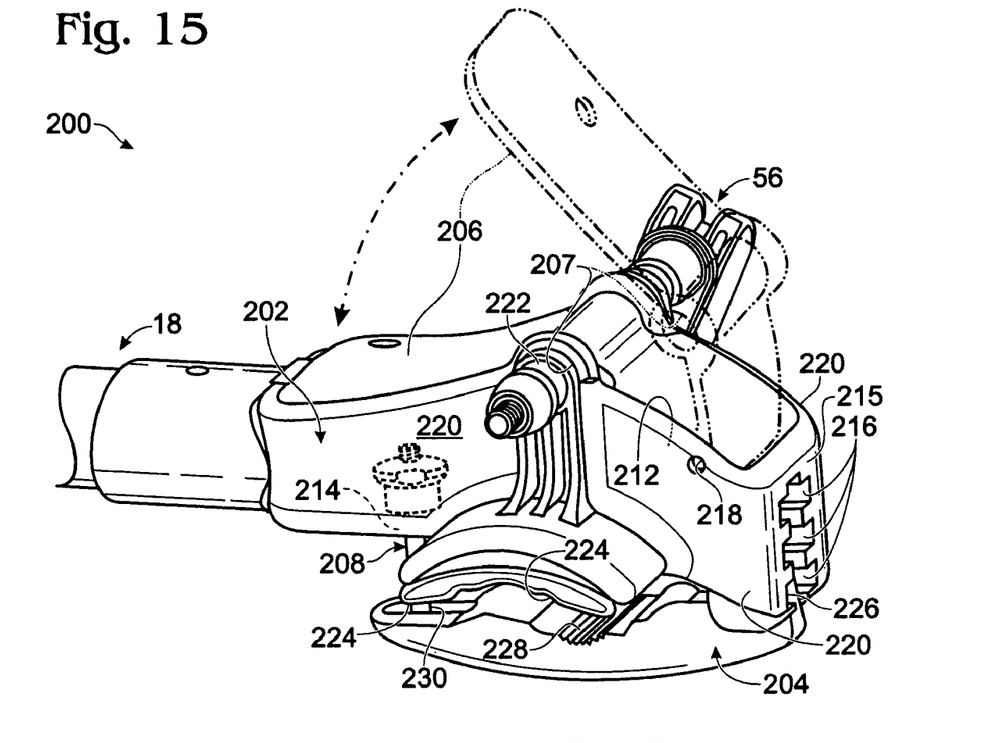
FIG. 15 is another embodiment of a fork mount.

FIG. 15 shows another embodiment of a fork mount, indicated at 200. Fork mount 200 includes a top clamp 202, a bottom clamp 204, a cover 206, a connector 208 (such as connector 54 described above), and a skewer 56. Top clamp 202 may be connected to front ends 30, 32 of rails 26, 28 in the same manner as described above for fork mount 20.

Top clamp 202 may include a hollow body 212 with a hole or opening 214 that receives connector 208, a front surface 215 with grooves 216, a pivoting mechanism 218 connected to cover 206, a pair of side surfaces 220 each with a hole or opening 222, and a bottom grip surface 224 that engages front crossbar 12.

Bottom clamp 204 may include a groove engager 226 (such as a bar) that engages any of grooves 216, a grip surface 228 that engages front crossbar 12, and a hole or opening 230 that receives connector 208.

Fork mount 200 operates in a similar way as fork mount 20, except that fork mount 200 employs a cover 206 as a securement piece instead of securement piece 52 of fork mount 20. Cover 206 may have an open position, shown in dashed lines in FIG. 15, which allows manipulation of connector 208 that may be housed within hollow body 212 when connector 208 is extended through substantially aligned holes 214 (of top clamp 202) and 230 (of bottom clamp 204). Cover 206 may have a closed position, shown in solid lines in FIG. 15, that prevents such manipulation. When cover 206 is in the closed position, skewer 56 may extend through substantially aligned holes 207 (of cover 206) and 222 (of top clamp 204).

Fork mount 200 and a bicycle fork may otherwise be secured to crossbar 12 in the manner set forth above for fork mount 20. In this embodiment, skewer 56 may also prevent removal of fork mount 200 and the bicycle fork from crossbar 12. When actuator handle 100 of skewer 56 is in the closed position, and lock 102 is in the locked position, skewer 56 cannot be removed from substantially aligned holes 207, 222. In turn, skewer 56 prevents cover 206 from being moved from the closed Position. In turn, cover 206, in the closed position, prevents manipulation of connector 208. In turn, top clamp 202 and bottom clamp 204 remain clamped or secured around crossbar 12 because connector 218 cannot be manipulated. The bicycle fork is also secured on skewer 56 to fork mount 200.

Another Fork Mount Embodiment

Figure 16:
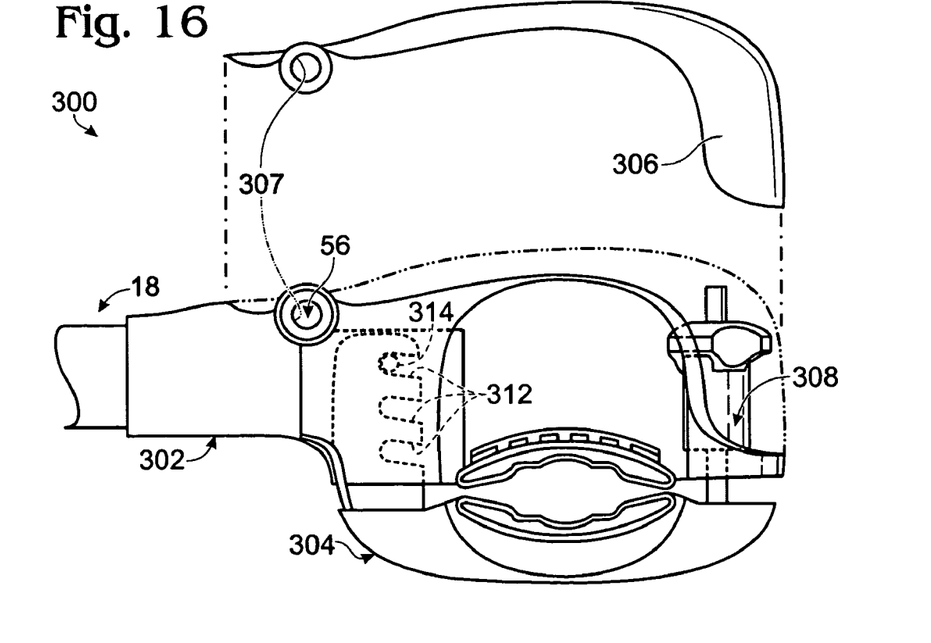
FIG. 16 is another embodiment of a fork mount.

FIG. 15 shows another embodiment of a fork mount, indicated at 300. Fork mount 300 includes a top clamp 302 with a grooved surface 312, a bottom clamp 304 with a groove engager 314, a cover 306 with a pair of holes or openings 307 that receive a skewer 56, and a connector 308 (similar to connectors 54 and/or 208). Fork mount 300 operates similar to the other embodiments, except that the location of grooved surface 312 and groove engager 314 is reversed with that of connector 308. Also, in this embodiment, cover 306 can either pivot on top clamp 302, as described above for fork mount 200, or can be completely removed from top clamp 302, as depicted in dashed lines in FIG. 16. As with cover 206, skewer 56 can secure cover 306 to fork mount 300 when skewer 56 is extended through substantially aligned holes or openings 307 of cover 306 and those of top clamp 302. In this manner, a lock of skewer 56 can secure a bicycle fork and fork mount 300 to crossbar 12.

In other embodiments, the top or upper clamp may include a groove engager, while the bottom or lower clamp has a surface with grooves. It should also be apparent that any of the components of any of the embodiments can be combined and used together. For example, another embodiment may include a combination of a cover, such as cover 206 and/or 306, with securement piece 52. Such a combination may be used to prevent manipulation of a connector, such as connector 54, 208 and/or 308, when such a connector is clamping the top or upper clamp and the bottom or lower clamp around a crossbar.

Rack examples include the following concepts:

A. A mounting system for securing a bicycle to a crossbar of a vehicle-mounted rack, comprising:
a pair of elongated members, which each include a front end, that are mounted in parallel adjacent each other with an open gap formed between the mounted elongated members,
a fork mount connected adjacent the front end of each of the elongated members,
a crossbar mount, coupled to the elongated members, that includes an upper clamp having a first hole in a first gripped surface and an adjustment surface with an adjuster area, and a lower clamp having a second hole in a second gripped surface and an adjuster area engager that is engagable with the adjuster area to form a pivot point into a clamped position in which the first and second holes are substantially alignable, and
a connector that, in the clamped position, extends through the open gap and through the substantially alignable first and second holes of the upper and lower clamps respectively.

A1. The mounting system of claim A, further comprising a rear tire mount having a first side, a second side, and a concave inner portion fitted within the open gap between the elongated members, wherein a ribbed strap is connected adjacent the first side that is tightened using a ratchet system positioned adjacent the second side.

A2. The mounting system of claim A1, wherein the crossbar mount is positioned on the elongated members between the rear tire mount and the fork mount.

A3. The mounting system of claim A, wherein the connector secures the upper clamp and lower clamp around the crossbar when in the clamped position.

A4. The mounting system of claim A, wherein the adjuster area is a plurality of horizontal grooves, and the adjuster area engager is a bar that frictionally engages any of the horizontal grooves.

A5. The mounting system of claim A4, wherein the horizontal grooves are vertically aligned.

While the present disclosure has been described in the context of providing a lockable mount for carrying a bicycle, it is to be understood that other articles, such as luggage, skis, canoes, or rafts may be carried on racks which have a lockable mount as described above. Moreover, it is not essential to the present disclosure that the rack be carried on a vehicle roof. Rather, such a rack with a lockable mount may be carried anywhere on a vehicle including the trunk, the cargo bed of a truck, or a portable trailer.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

We claim:

1. A rack for carrying a bike on top of a vehicle comprising a wheel tray having a front end portion and a pair of parallel bars separated laterally from one another to form a gap haying an open top and an open bottom,
first and second clamps for connecting the wheel tray to a pair of crossbars, one of the clamps being slidably engaged to the pair of bars and including a fastening member that passes through the gap substantially perpendicular to the bars of the tray,
a first gripping device connected to the tray for binding a rear wheel of a bike to the tray, and
a second gripping device connected to the front end portion of the tray for securing a front portion of a bike.

2. The rack of claim 1 wherein the second gripping device is configured to grip the front fork of a bike.

3. The rack of claim 1 wherein the second gripping device is configured to grip the front wheel of a bike.

4. The rack of claim 1 wherein a rear end portion of the wheel tray is U-shaped.

5. A rack for carrying a bike on top of a vehicle comprising a wheel tray having a pair of parallel bars separated laterally from one another to form a gap that communicates with an open top and an open bottom of the wheel tray,
first and second clamps for connecting the wheel tray to a pair of crossbars, one of the clamps being adjustably connected to the pair of bars and including a fastening member received in the gap, a first gripping device connected to the wheel tray for binding a rear wheel of a bike to the tray, and a second gripping device connected to the wheel tray for securing a front portion of a bike.

6. The rack of claim 5 wherein the fastening member passes through the gap substantially perpendicular to the bars of the tray.

7. The rack of claim 5 wherein the second gripping device includes a fork mount configured to grip the front fork of a bike.

8. The rack of claim 5 wherein the second gripping device is configured to grip a front wheel of a bike.

9. A rack for carrying a bike on top of a vehicle comprising
a wheel tray having an end portion,
a clamp for connecting the wheel tray to a first crossbar,
a gripping device connected to the wheel tray for binding a rear wheel of a bike to the wheel tray, and
a fork mount connected to the end portion of the wheel tray and configured to secure a bike fork to a second crossbar, the fork mount including
a top clamp portion connected to a bottom clamp portion,
a connector adjustable to secure the clamp portions in opposing engagement with the second crossbar,
a securement piece slideably connected to the wheel tray such that the securement piece is slideable between a first position that permits adjustment of the connector and a second position that prevents adjustment of the connector, the securement piece and the top clamp portion collectively providing a pair of openings that are aligned in the second position, and
a locking skewer extendable through the aligned pair of openings to block movement of the securement piece from the second position.

10. The rack of claim 9 wherein the securement piece includes a pair of protrusions engageable with a pair of slots of the top clamp portion and also includes an area between the protrusions that receives an adjustment portion of the connector, and wherein the protrusions restrict manipulation of the adjustment portion.

11. The rack of claim 9 wherein the connector includes an adjustment portion that is a graspable knob.

12. The rack of claim 9 wherein the connector includes a first member in threaded engagement with a second member, and wherein turning the first member allows adjustment of the distance between the top clamp portion and the bottom clamp portion.

13. The rack of claim 9 wherein the wheel tray has a pair of parallel bars separated laterally from one another to form a gap having an open top and an open bottom.

14. A rack for carrying a bike on top of a vehicle comprising
a wheel tray having an end portion,
a clamp for connecting the wheel tray to a first crossbar,
a gripping device connected to the wheel tray for binding a rear wheel of a bike to the wheel tray, and
a fork mount connected to the end portion of the wheel tray and configured to secure a bike fork to a second crossbar, the fork mount including
a top clamp portion connected to a bottom clamp portion,
a connector having a graspable member and being adjustable by turning the graspable member about an axis to secure the clamp portions in opposing engagement with the second crossbar,
a securement piece including a protrusion movable to an obstructing position that is lateral to the graspable member and that intersects a volume of revolution defined by a full turn of the graspable member about the axis, the securement piece and the top clamp portion collectively providing a pair of openings that are aligned in the obstructing position, and
a locking skewer extendable through the aligned pair of openings to block movement of the securement piece from the obstructing position.

15. The rack of claim 14 wherein the securement piece includes a pair of protrusions that opposingly flank the graspable member in the obstructing position.

16. The rack of claim 14 wherein the graspable member is a knob.

17. The rack of claim 14 wherein the connector includes a threaded member in threaded engagement with the graspable member, and wherein turning the graspable member allows adjustment of the distance between the top clamp portion and the bottom clamp portion.

18. The rack of claim 14 wherein the wheel tray has a pair of parallel bars separated laterally from one another to form a gap having an open top and an open bottom.

* * * * *